United States Patent
Kameyama et al.

(12) 
(10) Patent No.: US 6,353,067 B1
(45) Date of Patent: Mar. 5, 2002

(54) POLYOLEFIN STRETCH FILM

(75) Inventors: Masao Kameyama; Toshiyuki Ishii; Toshiki Itoh, all of Nagoya (JP)

(73) Assignees: Mitsui Chemicals, Inc.; Mitsui Kagaku Platech Co., Ltd., both of Tokyo (JP)

( * ) Notice: Subject to any disclaimer, the term of this patent is extended or adjusted under 35 U.S.C. 154(b) by 0 days.

(21) Appl. No.: 09/576,805

(22) Filed: May 23, 2000

(30) Foreign Application Priority Data

May 24, 1999 (JP) .......................................... 11-142895

(51) Int. Cl.$^7$ ................................................ C08F 20/10
(52) U.S. Cl. ................................... 526/318.45; 524/556
(58) Field of Search ...................... 524/556; 526/318.45

(56) References Cited

U.S. PATENT DOCUMENTS

| | | | | |
|---|---|---|---|---|
| 4,629,657 A | * | 12/1986 | Gulati | 428/461 |
| 5,093,194 A | * | 3/1992 | Touhsaent | 428/349 |
| 5,192,620 A | * | 3/1993 | Chu | 428/461 |
| 6,013,353 A | * | 1/2000 | Touhsaent | 428/203 |

FOREIGN PATENT DOCUMENTS

| | | |
|---|---|---|
| EP | 0109512 | 5/1984 |
| EP | 0521426 | 1/1993 |
| JP | 4506820 | 11/1992 |
| JP | 06322192 | 11/1994 |
| WO | WO9116376 | 10/1991 |

OTHER PUBLICATIONS

Takizawa Kenro et al—Patent Abstracts of Japan—06322192A—Nov. 22, 1994.
Harada Hiroshi et al—Patent Abstracts of Japan—53134591A—Nov. 24, 1978.
Inoue Tadashi et al—Patent Abstracts of Japan—55051536A—Apr. 15, 1980.

* cited by examiner

*Primary Examiner*—Paul R. Michl

(57) ABSTRACT

The polyolefin stretch film comprises a film produced from a resin composition principally composed of a polyolefin resin consisting either entirely of ethylene (meth)acrylic acid copolymer or ethylene (meth)acrylic acid (meth)acrylic ester terpolymer, or a mixed resin of both, and being, insofar as necessary, compounded with an anti-fogging agent and a tackifier, such film having a stress at 100% elongation in the longitudinal direction of 12–30 MPa and a stress at 100% elongation in the transverse direction of 5–11 MPa. This film is suitably used as a stretch wrap film material for packaging food and various items, inasmuch as it is free of pollution and sanitary/health hazard problems, and imparts a large elongation, excellent cut property of traverse direction, adherence/conformance property (cling property), elastic recovery after distention by fingertips, etc., adequate stress at 100% elongation and, moreover, a good balance between the stresses at elongation in the longitudinal direction and in the transverse direction, respectively, which properties all in all enable the film to accomplish wrapping virtually free of surface wrinkle formation and film breakage in a continuous stretch wrapping operation, thus rendering the film fully compatible with the automatic wrapping machine. Furthermore, since it can be formed at a high speed by the extrusion film forming technique employing a straight manifold die, the film has a merit of high productivity.

12 Claims, No Drawings

POLYOLEFIN STRETCH FILM

BACKGROUND OF THE INVENTION

The present invention relates to a stretch film (cling film) for packaging food and other items and a method for manufacturing the same.

The stretch wrap film material utilized to prepackage various kinds of food such as fruit and vegetables, fresh fish, meat, delicatessen, etc. by stretch wrapping the item to be packaged either directly or after placing the item on a light weight tray made of plastic, etc. used to be produced mainly from poly(vinyl chloride). Poly(vinyl chloride) film, however, would pose problems associated with environmental pollution and sanitary and health hazards. It is under said circumstance that polyolefin resins such as polyethylene, ethylene 1-butene copolymer, ethylene vinyl acetate copolymer have come to be used as raw materials for the stretch wrap film in these years.

Nonetheless, problems that ensued from the diversion from poly(vinyl chloride) to polyolefin were such that films produced from polyethylene and ethylene 1-butene copolymer are relatively hard, and hence not readily stretched and that ethylene vinyl acetate copolymer film is susceptible to breakage after the wrapping operation. Accordingly, there has been proposed a stretch wrap film material obtained by laminating a ethylene vinyl acetate copolymer layer onto both sides of a 1-butene-based resin layer (Japanese Laid-open Patent Application No. 1986 (Sho 61)-89040). Although the aforesaid problem associated with relatively high hardness and low stretchability of the film was thereby resolved, there still remained unresolved such further problem that the film gives only a narrow latitude of compatibility with the automatic wrapping machine. Another drawback was that sagging tends to occur when the item to be wrapped was loaded on the film.

For the purpose of remedying said shortcomings, there was proposed a film produced from a resin obtained by mixing ethylene (meth)acrylic acid (meth) acrylic ester copolymer with ethylene (meth)acrylic acid copolymer (Japanese Laid-open Patent Application No. 1994 (Hei 6)-322192). Nevertheless, said film did not give a satisfactory stress at elongation, etc., and hence, there still remained a need for such film that will have a further satisfactory compatibility with the automatic wrapping machine. Moreover, said film had the demerit of affording only a low productivity inherent to the blown (inflation) film extrusion system by which said film can be obtained.

SUMMARY OF THE INVENTION

The object of the present invention is to provide a polyolefin stretch film which possesses (a) a large elongation, cut property of traverse direction, adherence/conformance property (cling property), elastic recovery after distention by fingertips, etc., which are essential properties required of the stretch wrap film material to be used on the automatic wrapping machine, (b) a good balance between the stress at 100% elongation in the longitudinal direction and the stress at 100% elongation in the transverse direction, (c) the ability to accomplish wrinkle-free packaging, and (d) an excellent productivity; and to provide a process for manufacturing such film.

Other and further objects, features and advantages of the invention will appear more fully from the following description.

According to the present invention, the polyolefin stretch film of the present invention is produced from a resin composition comprising a polyolefin resin either consisting entirely of ethylene (meth)acrylic acid copolymer or ethylene (meth)acrylic acid (meth)acrylic ester terpolymer or consisting of a mixture of both, as a base resin and being, insofar as necessary, compounded with an anti-fogging agent and a tackifier, which is characterized in that the stress at 100% elongation in the longitudinal direction (the machine direction) is 12–30 MPa and the stress at 100% elongation in the transverse direction (the cross direction) is 5–11 MPa.

A preferred embodiment of the present invention is a polyolefin stretch film produced from a resin composition comprising 100 parts by weight of said polyolefin resin, 0.5–12 parts by weight of a tackifier and 1–5 parts by weight of an anti-fogging agent.

The preferred polyolefin stretch film of the present invention comprises a film produced from said resin composition by the extrusion film forming technique employing a straight manifold die. Furthermore, the preferred polyolefin stretch film of the present invention also comprises a film produced from said resin composition by the extrusion film forming technique employing a straight manifold die which has undergone an orientation preventing treatment.

The process for manufacturing the polyolefin stretch film of the present invention comprises carrying out an orientation preventing treatment in the course of producing a film by the extrusion film forming technique employing a straight manifold die from a resin composition comprising a polyolefin resin either consisting entirely of ethylene (meth) acrylic acid copolymer or ethylene (meth)acrylic acid (meth) acrylic ester terpolymer or consisting of a mixture of both, as a base resin and being, insofar as necessary, compounded with an anti-fogging agent and a tackifier either during the film forming step or after the film has been formed.

DETAILED DESCRIPTION OF THE PREFERRED EMBODIMENTS

Referring to the polyolefin stretch film of the present invention, a detailed description is given in the following as for the polyolefin resin composition constituting such film, the process for manufacturing the film and the stretch film thereby obtained.

The resin composition from which the film was produced of the present invention is comprising a polyolef in resin either consisting entirely of ethylene (meth)acrylic acid copolymer or ethylene (meth)acrylic acid (meth)acrylic ester terpolymer or consisting of a mixture of both, as a base resin and being, insofar as necessary, compounded with an anti-fogging agent and a tackifier.

The ethylene (meth)acrylic acid copolymer is manufactured by copolymerizing ethylene with methacrylic acid or copolymerizing ethylene with acrylic acid by the well-known radical polymerization process, etc., and the ratio of the structural unit component (hereinafter referred to simply as "component") derived from (meth)acrylic acid is preferably 3–20 mole %. When the ratio of (meth)acrylic acid component declines to an excessively low level deviating from said range, the flexibility and the elastic recovery after distention by fingertips of the obtained film tend to prove insufficient. On the contrary, when the ratio of (meth)acrylic acid component exceeds said range, the cut property of traverse direction of the obtained film often turns out to be insufficient.

The melt flow rate of ethylene (meth)acrylic acid copolymer (as determined in accordance with ASTM D1238 at a temperature of 190° C.) is generally 0.5–30 g/10 min.

The ethylene (meth)acrylic acid (meth)acrylic ester terpolymer is obtained by either copolymerizing ethylene with acrylic acid and (meth)acrylic ester or copolymerizing ethylene with acrylic acid and (meth)acrylic ester by the well-known radical polymerization process, etc.

The (meth)acrylic ester in this case is represented by acrylic ester or methacrylic ester whose alcohol residue is a hydrocarbon having 1–8 carbon atoms. As examples of such (meth)acrylic ester, there can be cited methyl acrylate, ethyl acrylate, isobutyl acrylate, n-butyl acrylate, 2-ethylhexyl acrylate, methyl methacrylate, isobutyl methacrylate, etc. Among the above-exemplified ester, the preferred ones are acrylic ester or methacrylic ester whose alcohol residue is a hydrocarbon having 4–6 carbon atoms.

A preferred ethylene (meth)acrylic acid (meth)acrylic ester terpolymer contains 3–20 mole % or preferably 5–15 mole % of a component derived from (meth)acrylic acid and 0.3–20 mole %, or preferably 0.7–15 mole %, or more preferably 1.0–15 mole % of a component derived from (meth)acrylic ester. In particular, an ethylene (meth)acrylic acid (meth)acrylic ester terpolymer containing 2 or less mole %, or preferably 0.3–2 mole % of a component derived from (meth)acrylic ester is preferred, in as much as it imparts an excellent tensile strength, and hence is by far less susceptible to breakage during the wrapping operation.

The melt flow rate of ethylene (meth)acrylic acid (meth) acrylic ester terpolymer (as determined in accordance with ASTM D1238 at a temperature of 190° C.) is generally 0.5–30 g/10 min.

It is preferable that 50–100 parts, or more preferably 60–100 parts by weight of ethylene (meth)acrylic acid (meth)acrylic ester terpolymer is contained in 100 parts by weight of the polyolefin resin component in the resin composition constituting the stretch film of the present invention. A film having an excellent tensile strength and a good balance between the stress at 100% elongation in the longitudinal direction and the stress at 100% elongation in the transverse direction can be obtained as long as the resin composition remains in said range, particularly in the range of a low (meth)acrylic ester component content, or more particularly at 7% by weight or less of (meth)acrylic ester component content in the polyolefin resin.

It is furthermore preferable that the polyolefin resin substantially comprises ethylene (meth)acrylic acid (meth) acrylic ester terpolymer.

Said polyolefin resin either consisting entirely of ethylene (meth)acrylic acid copolymer or ethylene (meth)acrylic acid (meth)acrylic ester terpolymer, or consisting of a mixture of both constitutes the base resin for the polyolefin stretch film of the present invention, and by way of using it as the base resin, there can be achieved the cut property of traverse direction, adherence/conformance property and elastic recovery after distention by fingertips, which are properties essentially required of the stretch wrap film material, while such base resin exhibits an excellent processibility in the extrusion film forming system employing a straight manifold die.

For the purpose of the present invention, other resin(s) may be added to said base resin to an extent not detrimental to the object of the present invention. As examples of such other resin(s), there can be cited an individual copolymer or a mixture of 2 or more kinds of copolymer selected from among polyethylene, ethylene-α-olefin copolymer, ethylene vinyl acetate copolymer, etc.

For the purpose of the present invention, it is preferably that the ratio of (meth)acrylic ester component to said base resin is 7% by weight or less, or more preferably 5% by weight or less, in as much as the tensile strength of the film remains high within such range. Although there is no particular lower limit for the (meth)acrylic ester component content of the base resin, it is generally 0.1% by weight or more, or preferably 1% by weight. or more, or more preferably 2% by weight or more.

For the purpose of improving the adherence/conformance property and clarity of the stretch film, it is preferable that a resin composition be prepared by adding 0.5–12 parts by weight, or preferably 2–10 parts by weight of a tackifier, and 1–5 parts by weight, or preferably 1.5–4 parts by weight of an anti-fogging agent to 100 parts by weight of a polyolefin resin consisting either entirely of said ethylene (meth)acrylic acid copolymer or ethylene (meth)acrylic acid (meth)acrylic ester terpolymer, or consisting of a mixture of both.

The tackifier is a solid amorphous polymer and is of such type that is generally used in adhesive tapes, paint, hot melt adhesive, and for similar applications. According to the type of starting monomer to be polymerized, there can be cited the following resins as examples of such tackifier.

Aliphatic hydrocarbon resin principally produced from C4 fraction, C5 fraction, and a mixture thereof obtained by cracking petroleum, naphtha, etc., or optional fraction(s) thereof, for example, isoprene, 1,3-pentadiene, etc. derived from C5 fraction; aromatic hydrocarbon resin produced from a styrene derivative(s) and indenes derived from C9 fraction obtained by cracking petroleum, naphtha, etc.; aliphatic-aromatic copolymerized hydrocarbon resin obtained by copolymerizing optional fractions selected from C4 fraction and C5 fraction with C9 fraction; alicyclic hydrocarbon resin obtained by hydrogenating an aromatic hydrocarbon resin; synthetic terpene hydrocarbon resin having a structure containing aliphatic, alicyclic and aromatic hydrocarbon resins; and terpene hydrocarbon resin produced from αβ-pinene in turpentine oil; cumarone-indene hydrocarbon resin produced from indenes and styrenes in coal tar-based naphtha; low molecular weight styrene resin; rosin-based hydrocarbon resin, etc.

Among said tackifiers, aliphatic hydrocarbon resin and alicyclic hydrocarbon resin obtained by hydrogenating aromatic hydrocarbon resin are preferably used, inasmuch as they possess favorable miscibility with ethylene (meth) acrylic acid copolymer. Furthermore, it is preferable to use alicyclic hydrocarbon having a softening point (as determined by a ring-and-ball test) of 105–150° C., or particularly 110–140° C., and a ratio of hydrogenation to the aromatic nucleus is 80% or more, or particularly 85% or more.

The anti-fogging agent is an additive compounded with the resin composition for the purpose of preventing the moisture in the air from fogging the film after it is condensed on the surface of the film, so long as the additive is capable of rendering the film surface hydrophilic and thus spreading water drops produced by condensation of the moisture, such additive will sufficiently serve as an anti-fogging agent without any limitation.

For example, surface-active agents may be used as such anti-fogging agent. There can be cited as specific examples sorbitan fatty acid ester such as sorbitan monooleate, sorbitan monolaurate, sorbitan monobehenate, sorbitan monostearate, etc.; glycerin fatty acid ester such as glycerin monooleate, glycerin monostearate, etc.; polyglycerin fatty acid ester such as diglycerin monooleate, diglycerin sesquilaurate, diglycerin sesquioleate, tetraglycerin monooleate, tetraglycerin monostearate, hexaglycerin monooleate, decaglycerin monooleate, decaglycerin monolaurate, etc.; polyoxialkylene ether such as polyoxiethylene lauryl ether, etc.; aliphatic amine such as lauryl diethanol amine; fatty acid amide such as oleamide, etc. The above-identified compounds may be used either individually or as a mixture of two or more kinds.

The stretch film of the present invention may include other additive(s) to an extent not detrimental to the object of this invention.

It is preferable that the stretch film of the present invention is manufactured from said resin composition by the extrusion film forming technique employing a straight manifold die. In the course of the film extruding operation employing a straight manifold die, it is preferable that the operation be carried out at a forming temperature of 200–250° C., at a draft (drawdown) ratio (the stretching ratio within the draft (drawdown) distance) of 60 or less, at a draft (drawdown) distance between the tip of the die and the point where the film contacts the chilled roll of 50 mm or longer, while the film is taken off at a film temperature of 40° C. or more and a stretching ratio of 1.2 times or less as the means to prevent the film from being oriented. It is preferable to carry out annealing as a further means for preventing orientation of the film, for instance, at a film temperature of 50–90° C. so as to limit the dimensional change of the film in the longitudinal direction (the shrinkage ratio) within a range of 1–5%. The orientation preventing treatment may be carried out either by carrying out the former film forming method during the film forming step, or by carrying out the latter method which comprises the annealing treatment. Furthermore, an orientation preventing treatment may be carried out by a combination of the said two methods. Alternatively, the annealing treatment may be carried out after the film is formed.

The stretch film of the present invention thus formed has a thickness of 10–200 µm, a stress at 100% elongation in the longitudinal direction of 12–30 MPa, or preferably 16–30 MPa, or more preferably 18–25 MPa, or particularly preferably 18–24 MPa, a stress at 100% elongation in the transverse direction of 5–11 MPa, or preferably 6–10 MPa, or more preferably 6–8 MPa. In consequence of the oppression of orientation in the longitudinal direction of the film, there can be achieved a good balance between the stress at 100% elongation in the longitudinal direction and the stress at 100% elongation in the transverse direction, and the ratio of [the stress at 100% elongation in the longitudinal direction] to [the stress at 100% elongation in the transverse direction] (LD/TD) settles preferably in a range of 1.5–3.0, or more preferably 1.7–2.5.

It is by the aforesaid procedure that there can be obtained a stretch film having excellent cut property of traverse direction, adherence/conformance property, and elastic recovery after distension by fingertips which is less susceptible to wrinkle formation in the package operation and has an excellent compatibility with the automatic packaging machine, thus permitting continuous stretch packaging operation interrupted only by least frequent film breakage.

Additionally, inasmuch as the stretch film of the present invention can be manufactured by the extrusion film forming technique employing a straight manifold die which affords a high productivity without going through the route of the conventional blown (inflation) film extrusion system, it is preferred for the economical reason, too.

The stretch film of the present invention may be finished, insofar as necessary, by laminating on one side or both sides of the film layer composed of said resin composition a film layer or film layers composed of other resin(s). In such case, the stresses at 100% elongation as a laminated film are within said range.

As an example of such other resin to constitute the surface layer in the laminated film, there can be cited polyolefins mainly comprising ethylene or propylene. As specific examples thereof, there can be cited at least one kind of polymer which can be formed into film such as polyethylene, polypropylene, ethylene-α-olefin copolymer, propylene-ethylene-butene copolymer, etc. Melt flow rates (as determined in accordance with ASTM D1238 at a temperature of 190° C.) of those polymers generally fall within a range of 0.5–30 g/10 min.

In case the stretch film of the present invention is a laminated film, the total thickness of other resin layers constituting surface layer(s) is generally 1–50 µm, or preferably 2–30 µm.

As the method for forming the laminated film, there may be employed well-known techniques such as the coextrusion method and the extrusion lamination method, both of which employing a straight manifold die.

EXAMPLES

In the following examples are described several preferred embodiments to illustrate the invention. However, it is to be understood that the invention is not intended to be limited to the specific embodiments.

The method for evaluating test items covered by Examples and Comparative Example are explained as follows.

(1) Tensile Test

The stress at 100% elongation and the tensile strength are determined by an Instron-type (i.e., the constant-rate-of-jaw-separation type) tensile testing machine, at a distance between grips of 50 mm, a speed of testing of 500 mm/min, using the tension test specimen having the dimensions designated as Type I in ASTM D638.

(2) Determination of the Film Thickness

An average thickness was calculated on the basis of the thickness measured in the transverse direction at 2-cm intervals, and said measurements were taken 5 times consecutively at every 10-m interval in the longitudinal direction. Lastly, the average value of such measurements was defined as the film thickness. A standard deviation was calculated on the basis of variances among all measurements.

(3) Shrinkage Ratio

The shrinkage ratio was calculated according to the following equation.

$$\text{Shrinkage } (\%) = $$
$$[(\text{Film speed on the Feed roll}) - (\text{Film speed on the Takeoff roll})/$$
$$\text{Film speed on the Feed roll}] \times 100$$

EXAMPLE 1

A film was formed by the extrusion film forming technique employing a straight manifold die under extruding conditions of a resin temperature of 220° C., a draft (drawdown) ratio of 50, and a draft (drawdown) distance of 80 mm. Then, after annealing the thus formed film at a film temperature of 80° C. as far as the shrinkage ratio in the longitudinal direction settles at 2% in the pre-windup stage and cooling the resultant film to a temperature of 30° C. or less, a stretch film having a thickness of 12 μm was obtained at a takeoff speed of 250 m/min. On an automatic wrapping machine (AW-3600 manufactured by Teraoka Seiko Co., Tokyo, Japan) charged with the obtained film (having a width of 350 mm), polystyrene trays (length×width=100 mm×150 mm) loaded with food were automatically packaged. In the packaging step, the film was stretched about 1.2 times in the transverse direction. 100 units of packaged trays were closely examined with respect to the frequency of film breakage and the frequency of surface wrinkle formation during the packaging stage. Test results are shown in Table 1 along with stresses at 100% elongation in the longitudinal direction and in the transverse direction, respectively. The obtained film exhibited good adherence/conformance (cling property) to the polystyrene tray.

The recipe of the resin composition from which the film was produced is as follows.

Ethylene methacrylic acid copolymer 76 parts by weight (methacrylic acid component content: 3.5 mole % (10% by weight) and melt flow rate: 8 g/10 min.)

Ethylene methacrylic acid isobutyl acrylate terpolymer 20 parts by weight (methacrylic acid component content: 3.4 mole % (9% by weight) and isobutyl acrylate component content: 2.0 mole % (8% by weight) and melt flow rate: 10 g/10 min.)

Tackifier 2 parts by weight (Clearon P-125, manufactured by Yasuhara Chemical Co., Ltd., Fuchu City, Hiroshima Prefecture, Japan)

Anti-fogging agent 2 parts by weight (0-71D manufactured by Riken Vitamins Co., Ltd., Tokyo, Japan)

Example 2

A stretch film was formed in the same procedure as in EXAMPLE 1, except that the recipe of the resin composition was modified as follows. Automatic wrapping operation was carried out in the same procedure as in EXAMPLE 1, using the film thereby obtained, and the wrapped trays were closely examined with respect to the frequency of film breakage and the frequency of surface wrinkle formation. Test results are shown in Table 1 along with measurements of the stresses at 100% elongation in the longitudinal direction and in the transverse direction, respectively. The obtained film exhibited good adherence/conformance to the polystyrene tray.

The recipe of the resin composition from which the film was produced is as follows.

Ethylene methacrylic acid isobutyl acrylate terpolymer 96 parts by weight (methacrylic acid component content: 3.4 mole % (9% by weight) and isobutyl acrylate component content: 1.0 mole % (4% by weight); melt flow rate: 10 g/10 min.)

Tackifier 2 parts by weight (Clearon P-125, manufactured by Yasuhara Chemical Co., Ltd., Fuchu City, Hiroshima Prefecture, Japan)

Anti-fogging agent 2 parts by weight (0-71D manufactured by Riken vitamins Co., Ltd., Tokyo, Japan)

|  | Stress at 100% elongation (LD*/TD) (MPa) | LD*-to-TD ratio of Stress at 100% elongation (LD*/TD) | Frequency of film breakage (Breaks/100 units) | Frequency of surface wrinkle formation (per 100 units) |
|---|---|---|---|---|
| Example 1 | 22/8 | 2.75 | 0 | 0 |
| Example 2 | 20/9 | 2.22 | 0 | 0 |

*LD/TD: Longitudinal direction/Transverse direction

Example 3

A film was formed by the extrusion film forming technique employing a straight manifold die under extruding conditions of a resin temperature of 220° C., a draft (drawdown) ratio of 50, and a draft (drawdown) distance of 80 mm, and then after orienting the thus formed film at a temperature of 45° C. (at a cast roll temperature of 30° C.) by an orientation ratio of 1.1 times and annealing the obtained film at a film temperature of 60° C. as far as the shrinkage ratio in the longitudinal direction settled at 4% and cooling the resultant film to a temperature of 30° C. or less, a stretch film having a thickness of 12 μm was formed at a takeoff speed of 250 m/min. On an automatic wrapping machine (AW-3600 manufactured by Teraoka Seiko Co., Tokyo, Japan) charged with the obtained film (having a width of 350 mm), polystyrene trays (length×width=150 mm×200 mm) loaded with food were automatically packaged. In the packaging step, the film was stretched about 1.7 times in the transverse direction. 100 units of packaged trays were closely examined with respect to the frequency of film breakage and the frequency of surface wrinkle formation during the packaging stage. Test results are shown in Table 2 along with the precision of thickness (standard deviation), stresses at 100% elongation in the longitudinal direction and in the transverse direction, respectively, and measurements of the tensile strength.

The recipe of the resin composition from which the film was produced is as follows.

Ethylene methacrylic acid copolymer 36 parts by weight (methacrylic acid component content: 3.5 mole % (10% by weight) and melt flow rate: 8 g/10 min.)

Ethylene methacrylic acid isobutyl acrylate terpolymer 60 parts by weight (methacrylic acid component content: 3.4 mole % (9% by weight) and isobutyl acrylate component content: 2.0 mole % (8% by weight) and melt flow rate: 10 g/10 min.)

Tackifier 2 parts by weight (Clearon P-125, manufactured by Yasuhara Chemical Co., Ltd., Fuchu City, Hiroshima Prefecture, Japan)

Anti-fogging agent 2 parts by weight (0-71D manufactured by Riken Vitamins Co., Ltd., Tokyo, Japan)

Example 4

A stretch film was formed in the same procedure as in EXAMPLE 3, except that the recipe of the resin composition was modified as follows. Automatic wrapping operation was carried out in the same procedure as in EXAMPLE 3, using the film thereby obtained, and the wrapped trays were closely examined with respect to the frequency of film breakage and the frequency of surface wrinkle formation during the packaging stage. Test results are shown in Table 2 along with precision of film thickness (standard deviation), measurements of the stresses at 100% elongation in the longitudinal direction and in the transverse direction, respectively, and measurements of the tensile strength.

The recipe of the resin composition from which the film was produced is as follows.

Ethylene methacrylic acid isobutyl acrylate terpolymer 96 parts by weight (methacrylic acid component content: 3.4 mole % (9% by weight) and isobutyl acrylate component content: 1.0 mole % (4% by weight), and melt flow rate: 10 g/10 min.)

Tackifier 2 parts by weight (Clearon P-125, manufactured by Yasuhara Chemical Co., Ltd., Fuchu City, Hiroshima Prefecture, Japan)

Anti-fogging agent 2 parts by weight (O-71D manufactured by Riken Vitamins Co., Ltd., Tokyo, Japan)

Comparative Example

A film was formed in the same procedure as in EXAMPLE 3, except that the film was formed by the extrusion film forming technique employing a straight manifold die under extruding conditions of a resin temperature of 220° C., a draft (drawdown) ratio of 70, and a draft (drawdown) distance of 40 mm. Then, after orienting the formed film at an orientation ratio of 1.3 times at a temperature of 30° C. (a cast roll temperature of 20° C.), the film was wound up. Automatic wrapping operation was carried out in the same procedure as in EXAMPLE 3, using the film thereby obtained, and the wrapped trays were closely examined with respect to the frequency of film breakage and the frequency of surface wrinkle formation during the packaging stage. Test results are shown in Table 2 along with precision of film thickness (standard deviation), measurements of the stresses at 100% elongation in the longitudinal direction and in the transverse direction, respectively, and measurements of the tensile strength.

be formed by the extrusion film forming technique employing a straight manifold die at a high speed.

The film forming method of the present invention is a highly economical method, since said stretch film can be manufactured at a high productivity.

What we claim is:

1. A polyolefin stretch film which comprises a film having a stress at 100% elongation in the longitudinal direction of 12–30 MPa and a stress at 100% elongation in the transverse direction of 5–11 MPa,
    said film being produced from a resin composition comprising a polyolefin resin either consisting entirely of ethylene (meth)acrylic acid copolymer or ethylene (meth)acrylic acid (meth)acrylic ester terpolymer or consisting of a mixture of both, as a base resin and being, insofar as necessary, compounded with an anti-fogging agent and a tackifier,
    wherein said film is produced from the resin composition by an extrusion film forming operation employing a straight manifold die.

2. A polyolefin stretch film according to claim 1, wherein the resin composition comprises 100 parts by weight of said polyolefin resin, 0.5–12 parts by weight of a tackifier, and 1–5 parts by weight of an anti-fogging agent.

3. A polyolefin stretch film according to claim 1, wherein the (meth)acrylic acid component content of said ethylene (meth)acrylic acid copolymer is 3–20 mole % and the (meth)acrylic acid component content and the (meth)acrylic ester component content of said ethylene (meth)acrylic acid (meth)acrylic ester terpolymer are 3–20 mole % and 0.3–20 mole %, respectively.

4. A polyolefin stretch film according to claim 1, wherein the (meth)acrylic ester component content of said polyolefin resin is 7% by weight or less.

5. A polyolefin stretch film according to claim 1, wherein the ethylene (meth)acrylic acid (meth)acrylic ester terpolymer content of said polyolefin resin is 60% by weight or more.

6. A polyolefin stretch film according to claim 1, wherein said polyolefin resin substantially comprises ethylene (meth)acrylic acid (meth)acrylic ester terpolymer.

TABLE 2

| | Precision of film thickness (standard deviation) ($\mu$m) | Stress at 100% Elongation (LD*/TD) (MPa) | LD*-to-TD ratio of Stress at 100% elongation (LD*/TD) | Tensile strength (LD*/TD) (MPa) | Frequency of film breakage (Breaks/100 units) | Frequency of surface wrinkle formation (per 100 units) |
|---|---|---|---|---|---|---|
| Example 3 | 0.3 | 18/8 | 2.3 | 26/19 | 0 | 0 |
| Example 4 | 0.3 | 17/7 | 2.4 | 31/20 | 0 | 0 |
| Comparative Ex. | 0.3 | 32/7 | 4.6 | 36/18 | 0 | 100 |

*LD/TD: Longitudinal direction/Transverse direction

The stretch film of the present invention can be suitably used as a stretch wrap film material for packaging food and other items, inasmuch as it is produced from olefin polymer, which is free of the environment pollution and sanitary/health hazard problems that have turned up from the use of poly(vinyl chloride); possesses a large elongation, an excellent cut property of traverse direction, adherence/conformance (cling property), elastic recovery after distention by fingertips, a good balance between the stress at 100% elongation in the longitudinal direction and in the transverse direction, respectively, etc.; is capable of being packaged virtually free of surface wrinkles as well as breakage in the continuous stretch wrapping operation, thus rendering itself fully compatible with the automatic wrapping machine. Besides, it has the merit of a high productivity, since it can 7. A polyolefin stretch film according to claim 1, wherein the ratio of the stress at 100% elongation in the longitudinal direction to the stress at 100% elongation in the transverse direction is 1.5–3.0.

8. A method for manufacturing a polyolefin stretch film which comprises carrying out an orientation preventing treatment either during the film forming step or thereafter in the course of forming a film by the extrusion film forming technique employing a straight manifold die from a resin composition comprising a polyolefin resin either consisting entirely of ethylene (meth)acrylic acid copolymer or ethylene (meth)acrylic acid (meth)acrylic ester terpolymer or consisting of a mixture of both, and being, insofar as necessary, compounded with an anti-fogging agent and a tackifier.

9. A polyolefin stretch film according to any one of claims 1 to 7, wherein the film forming operation is carried out at a temperature of 200–250° C., at a draft ratio of 60 or less, and at a draft distance between the tip of the die and the point where the film contacts the chilled roll of 50 mm or longer.

10. A polyolefin stretch film according to claim 1, wherein the film is taken off at a film temperature of 40° C. or more and a stretching ratio of 1.2 times or less.

11. A polyolefin stretch film according to claim 9, wherein the film is annealed after the film forming operation.

12. A polyolefin stretch film according to claim 11, wherein the annealing is carried out at a film temperature of 50–90° C. so as to limit the dimensional change of the film in the longitudinal direction (the shrinkage ratio) within a range of 1–5%.

* * * * *